United States Patent Office 3,531,143
Patented Sept. 29, 1970

3,531,143
HEAD-FORMATION OF FLEXIBLE HOSES, ESPECIALLY FOR DEEP-DRILLING HOSES
László Horvath, Gusztáv Gündisch, Mihály Árvai, and Sándor Antal, Budapest, Hungary, assignors to Orszagos Gumiipari Vallalat, Budapest, Hungary, a firm
Filed Jan. 18, 1968, Ser. No. 698,765
Claims priority, application Hungary, Jan. 20, 1967, OA-333
Int. Cl. F16l *39/00*
U.S. Cl. 285—149                      6 Claims

ABSTRACT OF THE DISCLOSURE

A joint assembly for flexible hose having a plurality of coaxial load-bearing layers (e.g., of wire reinforcement). A feeding member of stepped profile with coaxial, axially staggered steps corresponding to those of the layers of reinforcement is joined to the hose with a thixotropic bonding agent between the respective feeding step and the reinforcement layer. The thixopropic adhesive may be an epoxy containing short lengths of metal or glass fiber as a filler.

---

The invention relates to a joint head or head-formation serving to couple flexible hoses made of elastomers reinforced with fibrous material, e.g., steel wire. A typical example for such a head-formation is a deep-drilling hose joint head. Therefore the invention will be described in connection with such an example without restricting its general validity and applicability.

From literature and practice a number of flexible-hose joint heads are known, with the aid of which the coupling of flexible hoses made of elastomers, if necessary reinforced with fibrous material, can be achieved. In such joint heads the attachment of metal fittings to flexible hoses creates the greatest difficulty because the yielding character of elastomers under the effect of sustained load permits the flexible hoses easily to slip out of the metal fitting. To obtain a secure fastening, the designers were heretofore forced to apply complicated devices.

In known head formations the joint elements are multipart, are relatively complicated, and may be large-diameter devices the assembly of which demands good craftsmanship and lengthy work. In joint elements of this sort on account of the yielding character of elastomers, displacement is very frequent under dynamic stress, which leads to leakage and slippage down of the joint element. A further disadvantage is that the transition layer between the rigid joint element and the flexible hose is a stress-accumulating spot and this in case of sustained stress leads to fatigue cracks and premature failure of the flexible hose.

It is, therefore, the principal object of the present invention to provide a coupling or joint assembly for flexible hose or the like having a plurality of coaxial reinforcing layers (e.g., steel-wire insert windings), wherein the aforementioned disadvantages can be avoided.

SUMMARY OF THE INVENTION

The above and other objects which will become apparent hereinafter are attained in accordance with the present invention, by a joint head or coupling assembly for flexible hoses which comprises a flexible-hose structure of the laminated type in which a plurality of coaxial load-bearing insert layers in the form of steel wire, textile or fiber-like material, and a body of flexible material in which the layers are received. A joint member, consisting of a one-piece (unitary) metal pipe, has a stepped profile with axially staggered coaxial cylindrical surfaces of different diameters forming respective steps, each of which is juxtaposed with a respective load-bearing layer of the hose and is secured thereto with an adhesive material forming a tight bond adapted to resist stress and strain, the adhesive containing a fibrous material, e.g., relatively short lengths of steel and glass fibers.

The subject of the present invention is the formation of a joint head free from the above drawbacks and the essence of it is that the joint element is a single piece of pipe, the coupling end of which is threaded and the inner surface of which is stepped in such a way that each insert layer bearing the load in the hose is situated in front of an inner cylindrical surface of the said pipe, and the cylindrical, stepped space between the inner surfaces of the pipe and the binding wires belonging to the said bearing layers is filled with an adhesive material forming a close bond with the load-bearing layers, this bond being suitable for power transmission in itself, and containing a fibrous material.

The manufacturing of the joint-head according to the invention is carried out as follows:

If the reinforcing elements are steel wires, they are left free at the end of the hose and fastened with wire jointing. After the fixing and surface-degreasing a metal adhesive is applied in a thin layer on the surface of the fibers. Subsequently, the joint element, covered with an adhesive at its inner part, is put on and the free space left between the joint and the hose is filled with a thixotropic metal adhesive containing, if necessary, short glass and/or metal fibers. Known adhesives, e.g., epoxy resins can be used.

The thixotropic adhesives have the advantage that when they are under pressure and they flow, they are loose or of low viscosity, but when they come to rest, their viscosity is increased and so they do not flow out.

With flexible hoses supplied with reinforcing inserts made of textile, where the fitting of the joint elements occurs only after the vulcanization, the first step is to free or expose the reinforcing inserts. With low pressure hoses, the step of making the reinforcing inserts free can be omitted and the joint element can be fitted directly onto the cover.

Before putting on the joint element, a properly calibrated fixing and reinforcing element is wound in spiral form onto the prepared surface. For this purpose a supporting mandrel is inserted into the flexible hose. Subsequently, an adhesive is applied in a thin layer onto the surface. After putting on the joint element covered with an adhesive at the internal part, the gap is filled with an adhesive reinforced with glass fiber.

The joint head will be supplied in every case with a filling vent below and an air vent above, so as to easily fill the interspace with the adhesive.

The applying of the simple joint element according to the invention was made possible by the following consideration: High-molecular weight adhesives are not so suitable for sustained and repeated load and dynamic stress, because they are inclined to a slow deformation (cold creep). This cold creep, however, can be prevented by mixing into the adhesive a textile filler material giving thixotropic character. In the case of hoses, glass fibers, preferably shorter than 10 mm., is listed. In the case of wire-reinforced hoses, glass fibers and/or metal fibers may be used. This procedure makes it possible to form a flexible bonding layer coacting with the fixing fibers and reinforcing carcass, which reduces the fatigue of the bonding both under dynamic stress and sustained load.

Thus the invention is based on the discovery that a joint of this type may be manufactured in a quite satisfactory way by means of one single piece of pipe, if this pipe is fastened to the hose by an adhesive mixed with fibrous material, and in such a way that every layer of the hose bearing the load is fixed, to the pipe. By this measure a very good and long lasting bond and a perfect power transmission is achieved between the pipe and the hose, so that it is not necessary to use the heavy and expensive binding elements (rims, screws, etc.) which were thought to be indispensable up to now. Probably this advantage is attained by a physical and chemical bond between the adhesive material and the metallic parts.

The invention is further described with reference to the accompanying drawing. In the drawing.

Figure 1:
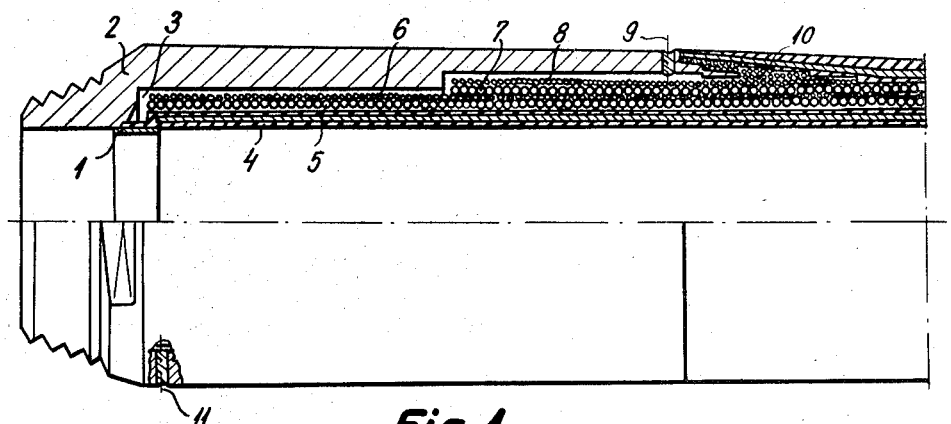
FIG. 1 shows the longitudinal section of a joint head supplied with a bond within the joint element, for heavy duty deep-drilling hoses.

At the example shown in FIG. 1 after building up to the inner tube 4 ending within the joint element 2, the wire inserts 5 and 7 will be fixed by binding wires 6 and 8. The task of the binding wires besides the fixing is to prevent a fatigue failure of the binding coacting with the filling adhesive contaniing fine glass or metal fibers. Before sticking on the joint element 2, the metal surfaces will be degreased by washing with solvents. The inner surface of the joint element 2 can be corrugated for heavy duty hoses in order to secure a better binding.

After putting on the joint element is fixed by a binding wire 10. A binding wire secures moreover a gradual transition between the rigid joint element and the flexible hose, the binding will be performed in several layers, so that the layers are different in length and the binding wire 10 is wound in several layers onto the conical or stepped end of pipe 2. So the developing of stress-accumulating spots are eliminated and the fatigue failure near the joint elements of the hoses will be prevented.

The hollow space 3 between the wire inserts 5 and 7 and the stepped cylindrical inner surfaces of the joint element 2 will be filled up with a metal adhesive through the filling vent 11 below, with the aid of a pump. The finishing of the filling up will be indicated by the adhesive appearing at the vent 9 on the upper part of the pipe 2.

The elastic metal plate insert 1 serves the prevention of outflow of the adhesive at filling-up.

Figure 2:
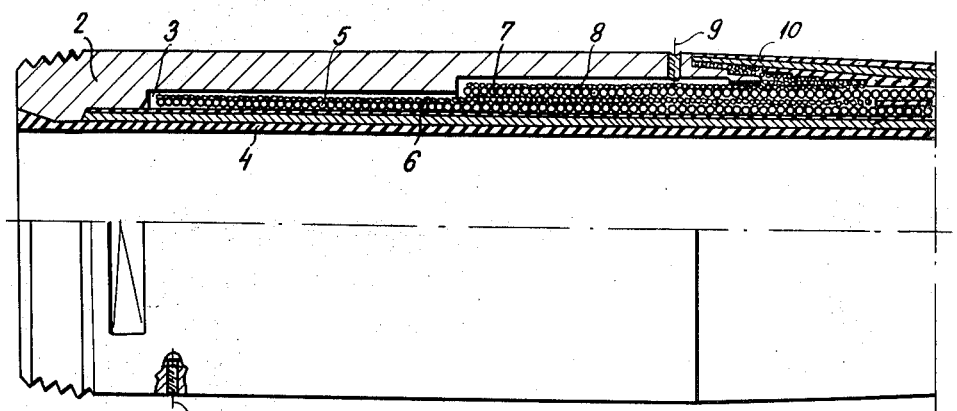
FIG. 2 is the longitudinal section of a similar joint head with a bond going through the entire pipe cross section.

In the embodiment shown in FIG. 2 the buildup of the hose and the filling up of the adhesive are made in a similar way, but the security of the packing will be increased by vulcanizing the inner tube 4 to the inner surface of the joint element 2 with the aid of a well-known rubber-to-metal bonding. For this sake the surfaces will be suitably prepared and the pressure necessary to the bonding will be secured by a plunger moved by spring force from the direction of the front end.

Figure 3:
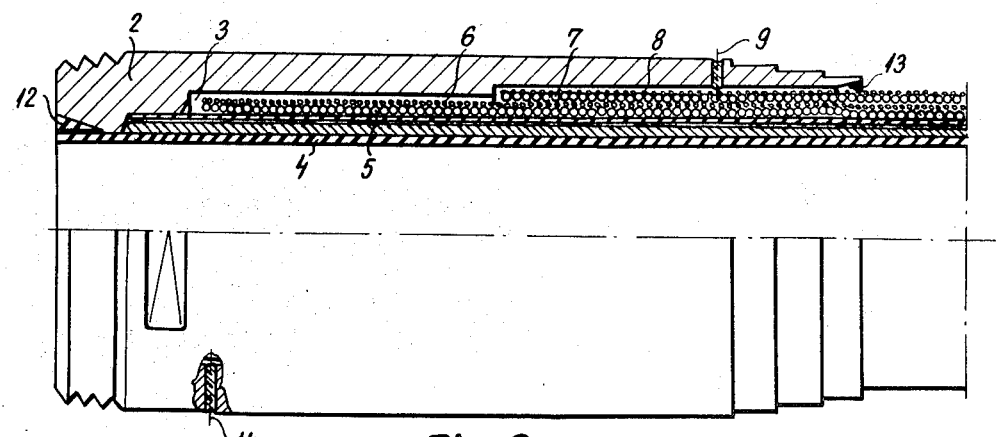
FIG. 3 shows the mounting of the packing ring in the stage before injecting the adhesive.

FIG. 3 shows the place of the tapered ring 12 and the O-sectional ring 13 in the stage before vulcanization. The use of these two rings prevents the outflow of the adhesive at the ends of the free space, and so it fills out the space between the joint element and the wires and within the fibrous materials, and so produces the force necessary for fixing.

For the purpose of sticking different well-known materials can be used; besides the above mentioned epoxy resins also the polyurethane and polyester resins are able to secure a satisfactory strength.

In fact, the joint head according to the invention consists substantially of one piece, which is of lightweight and is easy to manufacture from a tube by machining, forging or casting (suitably with centrifugal casting). For putting the joint element onto the hose no screwing or pressing is needed, so no large-sized machines are necessary for fitting. For building up the joint element it is not necessary to fold back the cords of the carcass of the flexible hose, which on the one hand makes the fitting easier and faster, and on the other hand the length of the reinforcing elements to be built into the flexible hose decreases. The coupling diameter corresponds to the hose diameter, what makes the appearance of the product very favorable.

What we claim is:

1. A hose-coupling assembly comprising a flexible hose having a plurality of coaxial load-bearing layers and a body of flexible material receiving said load-bearing layers, said load-bearing layers being axially staggered at one end of said hose to form a plurality of steps; a unitary tubular fitting member of stepped profile received on said end and formed with a plurality of axially staggered generally cylindrical steps of different diameter, each juxtaposed with the load-bearing layer of a corresponding step of said hose; and an adhesive bonding each of said load-bearing layers with the respective step of said member in stress- and strain-resisting relationship, said adhesive containing a fibrous filler.

2. The assembly defined in claim 1 wherein said fibrous filler includes metal fibers.

3. The assembly defined in claim 1 wherein said fibrous filler includes glass fibers.

4. The assembly defined in claim 1 wherein said filler consists of fibers having a length less than about 10 mm.

5. The assembly defined in claim 1 wheren said member has an end portion converging away from said end and surrounding a portion of said hose rearwardly of said end, said assembly further comprising a winding of binding wire wound about said hose in a plurality of layers and extending onto said end portion.

6. The assembly defined in claim 1 wherein said adhesive is a thixotropic material.

References Cited

UNITED STATES PATENTS

| | | | |
|---|---|---|---|
| 2,234,350 | 3/1941 | Muller | 285—149 |
| 2,277,397 | 3/1942 | Graham | 285—238 X |
| 2,428,189 | 9/1947 | Wolfram | 285—149 |
| 2,506,494 | 5/1950 | Feiler et al. | 285—149 |
| 2,809,056 | 10/1957 | Kaiser | 285—149 |
| 2,825,364 | 3/1958 | Cullen et al. | 285—149 |
| 3,118,691 | 1/1964 | Press | 285—149 |

DAVID J. WILLIAMOWSKY, Primary Examiner

W. L. SHEDD, Assistant Examiner

U.S. Cl. X.R.

138—109; 285—174, 238